UNITED STATES PATENT OFFICE.

HENRY V. DUNHAM, OF MOUNT VERNON, NEW YORK.

STABLE CASEIN SOLUTION AND PROCESS OF MAKING SAME.

1,347,845.  Specification of Letters Patent.  Patented July 27, 1920.

No Drawing.  Application filed March 25, 1919. Serial No. 285,078.

*To all whom it may concern:*

Be it known that I, HENRY V. DUNHAM, a citizen of the United States, residing at Mount Vernon, in the county of Westchester and State of New York, have invented certain new and useful Improvements in Stable Casein Solutions and Processes of Making Same, of which the following is a specification.

The present invention relates to the production of a novel solution containing casein, and involves the employment of a novel casein solvent, producing a solution of the casein having new and highly useful properties. The solvent includes as a constituent, a water-soluble salt of fluoboric acid, which may be neutralized with caustic soda, ammonia or equivalent alkali, or a mixture of such alkalis for instance a mixture of sodium and ammonium hydroxids.

It is well known that casein can be dissolved in water containing an alkali, such as sodium carbonate, sodium bi-carbonate, caustic soda, ammonia, or salts of alkalis which have an alkaline reaction, so as to produce a solution of casein, or the alkali metal salts of casein, or other salt of casein, generally having either an alkaline reaction to litmus, where an excess of the alkali is used, or a neutral reaction, where an excess of casein is used.

In accordance with the present invention, I start with a solution containing a fluoborate, which enables the production of a solution of casein, of a useful concentration, which may have a reaction decidedly acid to litmus, the acid reaction is however not entirely necessary, and in some instances it is advisable to produce a solution which is more nearly neutral, by the joint action of a fluoborate and a salt having an alkaline reaction to litmus, for example sodium carbonate or bi-carbonate.

As a specific example, to which the scope of the invention is not restricted,

An aqueous solution of hydrofluoric acid is saturated, say at room temperature, with boric acid crystals, thereby forming fluoboric acid, and this latter is then neutralized with an alkali, for example with caustic soda, forming the alkali (sodium) fluoborate, in aqueous solution. The fluoborates of the alkali metals are as a rule, slightly acid to litmus, although of course the solutions can be made neutral or slightly alkaline if desired. These salts, in the form of aqueous solution, exert the property of assisting the solution (dissolving) of casein.

If an acid fluoborate is used to the extent of about 15 parts of this material to 85 parts of dry powdered commercial casein, and about 400 parts of water, and the mixture thoroughly mixed and heated, one secures a solution of casein which is decidedly acid to litmus. Such a solution is highly useful for employment as a sizing or an adhesive, where a sizing or adhesive having an acid reaction is desired.

It is sometimes advisable to use two fluoborates in conjunction with each other, or to use one or more fluoborates and an alkali in conjunction, or to use fluoborates with other salts than alkalis, particularly other salts having an alkaline reaction, such as trisodium phosphate. As examples of such procedure I cite the use of ammonium-sodium fluoborate, or a mixture of this or sodium fluoborate with sodium carbonate, sodium bi-carbonate or trisodium phosphate. Thus I might employ 5% of fluoborate and 15% of trisodium phosphate, or 5% of fluoborate and 10% of soda ash.

The solution of casein produced by the above methods may be dried, for example on a milk drying machine, and the product of such operation is water-soluble, or the solution may be made up, at the time it is to be used, depending upon the practice in any particular factory.

The above example is given for the purpose of illustration, and not as limiting the invention thereto.

What I claim is:

1. A solution containing a fluoborate and casein.

2. A solution containing a fluoborate and casein, said solution being acid to litmus.

3. A solution containing a fluoborate of an alkali and containing casein.

4. A solution containing a fluoborate of a plurality of alkalis and containing casein.

5. A solution containing double fluoborate of sodium and ammonium and containing casein.

6. A solution containing casein and a fluoborate and a substance of alkaline reaction, 7. A process which comprises mixing casein and a fluoborate in an aqueous vehicle.

8. A process which comprises mixing casein and a fluoborate of acid reaction.

9. A process which comprises mixing casein and a fluoborate and another compound having the property of dissolving casein.

10. A process which comprises dissolving boric acid in hydrofluoric acid solution, adding an alkali to form a salt, adding casein and agitating and heating.

In testimony whereof I affix my signature.

HENRY V. DUNHAM.